(12) United States Patent
Pauls et al.

(10) Patent No.: US 6,920,150 B1
(45) Date of Patent: Jul. 19, 2005

(54) ADAPTIVE COMMUNICATIONS TRANSCODING AND ERROR CONTROL

(75) Inventors: Richard Joseph Pauls, Newton, NJ (US); Michael Charles Recchione, Nutley, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 823 days.

(21) Appl. No.: 08/940,760

(22) Filed: Sep. 30, 1997

(51) Int. Cl.[7] .................................................. H04J 3/16
(52) U.S. Cl. ...................................... 370/465; 714/752
(58) Field of Search ................................. 370/465, 466, 370/467; 714/746, 752, 758, 759, 761, 762

(56) References Cited

U.S. PATENT DOCUMENTS

| | | | |
|---|---|---|---|
| 5,490,168 A | | 2/1996 | Phillips et al. |
| 5,513,181 A | * | 4/1996 | Bresalier et al. ............ 370/465 |
| 5,533,004 A | | 7/1996 | Jasper et al. |
| 5,657,420 A | | 8/1997 | Jacobs et al. |
| 5,940,772 A | | 8/1999 | Kameda |
| 6,202,188 B1 | * | 3/2001 | Suzuki et al. ............... 714/758 |

FOREIGN PATENT DOCUMENTS

| | | | |
|---|---|---|---|
| JP | 05316082 A | 11/1993 | |
| JP | 06113298 A | 4/1994 | |
| JP | 07245600 A | 9/1995 | |
| JP | 09214507 A | 8/1997 | |
| WO | WO95/15655 | 6/1995 | ............ H04N/7/16 |

OTHER PUBLICATIONS

Fox et al.: "Adapting To Network And Client Variability Via On–Demand Dynamic Distillation." Sep. 1, 1996; vol. 31; p. 160–170 ACM Sigplan Notices, US Association For Computing Machinery.

Hui Zao et al.: "New Go–Back–N Arq Protocols For Point–To Multipoint Communications." Aug. 1, 1994; vol. E77B ; p. 1013–1022; IEICE Transactions On Communications.

Han R. et al.: "Dynamic Adaptation In An Image Transcoding Proxy For Mobile Web Browsing." Dec.1, 1998; vol. 5 p. 8–17; IEEE Personal Communications.

Kentarou Fukuda et al., "The relationship bdetween QoS parameters and requierd bandwidth in MPEG–2 video", 1997, Department of Informatics and Matematical Science.

Hui Zhao, Toru Sato, and Iwane Kimura, "New Go–Back–N ARQ Protocols for Point–to–Multipoint Communications," IEICE Transactions on Communications, vol. E77–B, No. 8, Tokyo, JP, Aug. 1994, pp. 1013–1022.

Richard Han, Pravin Bhagwat, Richard LaMaire, Todd Mumert, Veronique Perret, and Jim Rubas, IBM T. J. Watson Research Center, "Dynamic Adaptation in an Image Transcoding Proxy for Mobile Web Browsing," IEEE Personal Communications, Dec. 1998, pp. 8–17.

* cited by examiner

Primary Examiner—Bob Phunkulh
(74) Attorney, Agent, or Firm—Jimmy Goo

(57) ABSTRACT

The present invention is a method for improving data transfer performance over communications networks connecting data networks and users using adaptive communications formatting. Adaptive communications formatting includes encoding (or compressing) the data and applying error control schemes to reduce the amount of data being transmitted and to correct and/or conceal errors occurring during data transmission. In one embodiment, the present invention uses a set of transcoding techniques to encode (or compress) the data and a set of error control schemes to correct and/or conceal errors occurring during data transmission. The particular sets of transcoding techniques and error control schemes selected to format the data are adaptive to factors, such as the nature of the communications network connecting a user to an access server on the data network, the preferences of the user, and the data type of the data being transmitted to the user (or the access server).

35 Claims, 4 Drawing Sheets

FIG. 4

| USER # | TEXT | | SPEECH/VOICE | | VIDEO/IMAGE | |
|---|---|---|---|---|---|---|
| | TRANSCODER | ADAPTATION LAYER | TRANSCODER | ADAPTATION LAYER | TRANSCODER | ADAPTATION LAYER |
| 000001 | TEXT 1 | TEXT 1 | SPEECH/VOICE 2 | SPEECH/VOICE 2 | VIDEO/IMAGE 1 | VIDEO/IMAGE 1 |
| 000100 | TEXT 2 | TEXT 2 | SPEECH/VOICE 1 | SPEECH/VOICE 1 | VIDEO/IMAGE 1 | VIDEO/IMAGE 1 |
| 000200 | TEXT 2 | TEXT 2 | SPEECH/VOICE 2 | SPEECH/VOICE 2 | VIDEO/IMAGE 2 | VIDEO/IMAGE 2 |
| 000222 | NONE | NONE | NONE | NONE | NONE | NONE |
| 000300 | TEXT 1 | TEXT 1 | SPEECH/VOICE 2 | SPEECH/VOICE 2 | VIDEO/IMAGE 1 | VIDEO/IMAGE 1 |
| 000333 | TEXT 1 | TEXT 1 | SPEECH/VOICE 1 | SPEECH/VOICE 1 | VIDEO/IMAGE 1 | VIDEO/IMAGE 1 |
| 004000 | TEXT 2 | TEXT 2 | SPEECH/VOICE 1 | SPEECH/VOICE 1 | VIDEO/IMAGE 2 | VIDEO/IMAGE 2 |

FIG. 5

| DATA TYPE | SUB-TYPES (BIT RATE) | TRANSCODER ENCODING ALGORITHMS (BIT RATE) | ADAPTATION LAYERS |
|---|---|---|---|
| SPEECH/VOICE | AUDIO (256 Kbps)<br>WAVE (64 Kbps)<br>SPEECH (32 Kbps) | VCELP (8Kbps)<br>VSELP (8Kbps)<br>EDRU (4-8 Kbps) | HYBRID ARQ<br>ERROR CONCEALMENT (MUTING) |
| VIDEO/IMAGE | TIFF<br>GIFF (1.5Mbps)<br>MPEG<br>MPEG2 (2.0 Mbps) | H.263 (8-24 Kbps) | HYBRID ARQ<br>ERROR CONCEALMENT (INTERPOLATION) |
| TEXT | ASCII<br>MSWORD | GZIP<br>PKZIP | ARQ |

50

ADAPTIVE COMMUNICATIONS TRANSCODING AND ERROR CONTROL

BACKGROUND OF THE INVENTION

Subscribers of wireless communications systems are increasing to phenomenal numbers with more than forty-five million subscribers in the United States and one-hundred and twenty million subscribers worldwide. As new service providers enter the wireless communication market, the level of competition for old service providers increases to retain existing customer base while attracting new subscribers. To maintain continued growth of subscriber numbers and revenue levels, service providers are offering value-added services to their subscribers.

The Internet explosion has provided service providers of wired and wireless communications systems with a direction for developing value-added services. Currently, there are more than fifty million users of the Internet. Access to the Internet is typically via a wired communication network. However, wired Internet access requires some type of physical connection between the users and the wired communications network. Thus, the mobility of users accessing the Internet via a wired connection is severely limited. By contrast, access to the Internet via a wireless communications system offers a great deal of mobility to users/subscribers. However, wireless Internet access can be prohibitively expensive to most users/subscribers. Specifically, wireless communications systems, such as those based on the GSM and IS-95 CDMA standards, are limited in air interface access speeds (i.e., narrow bandwidth) and are subjected to an error prone transmission environment. For example, data transmitted over an IS-95 CDMA based wireless communication systems may be subject to a 3% or more bit error rate. Such limitations increase the amount of time required for successful data transfers between the Internet and the user/subscriber which, in turn, increases the cost of a wireless telephone call to the user/subscriber. Accordingly, there exists a need to improve data transfer performance (i.e., reduce transmission time) over communication networks connecting the Internet or other data networks to the user/subscriber.

SUMMARY OF THE INVENTION

The present invention is a method for improving data transfer performance over communications networks connecting data networks and users using adaptive communications formatting. Adaptive communications formatting includes encoding (or compressing) the data and applying error control schemes to reduce the amount of data being transmitted and to correct and/or conceal errors occurring during data transmission. In one embodiment, the present invention uses a set of transcoding techniques to encode (or compress) the data and a set of error control schemes to correct and/or conceal errors occurring during data transmission. The particular sets of transcoding techniques and error control schemes selected to format the data are adaptive to factors, such as the nature of the communications network connecting a user to an access server on the data network, the preferences of the user, and the data type of the data being transmitted to the user (or the access server).

BRIEF DESCRIPTION OF THE DRAWINGS

The features, aspects, and advantages of the present invention will become better understood with regard to the following description, appended claims, and accompanying drawings where:

FIG. 4 depicts a table for selecting transcoding techniques and error control schemes to use to format data; and FIG. 5 depicts a chart illustrating examples transcoding techniques and error control schemes which might be used for transmission of particular data types over wireless connections.

DETAILED DESCRIPTION

Figure 1:
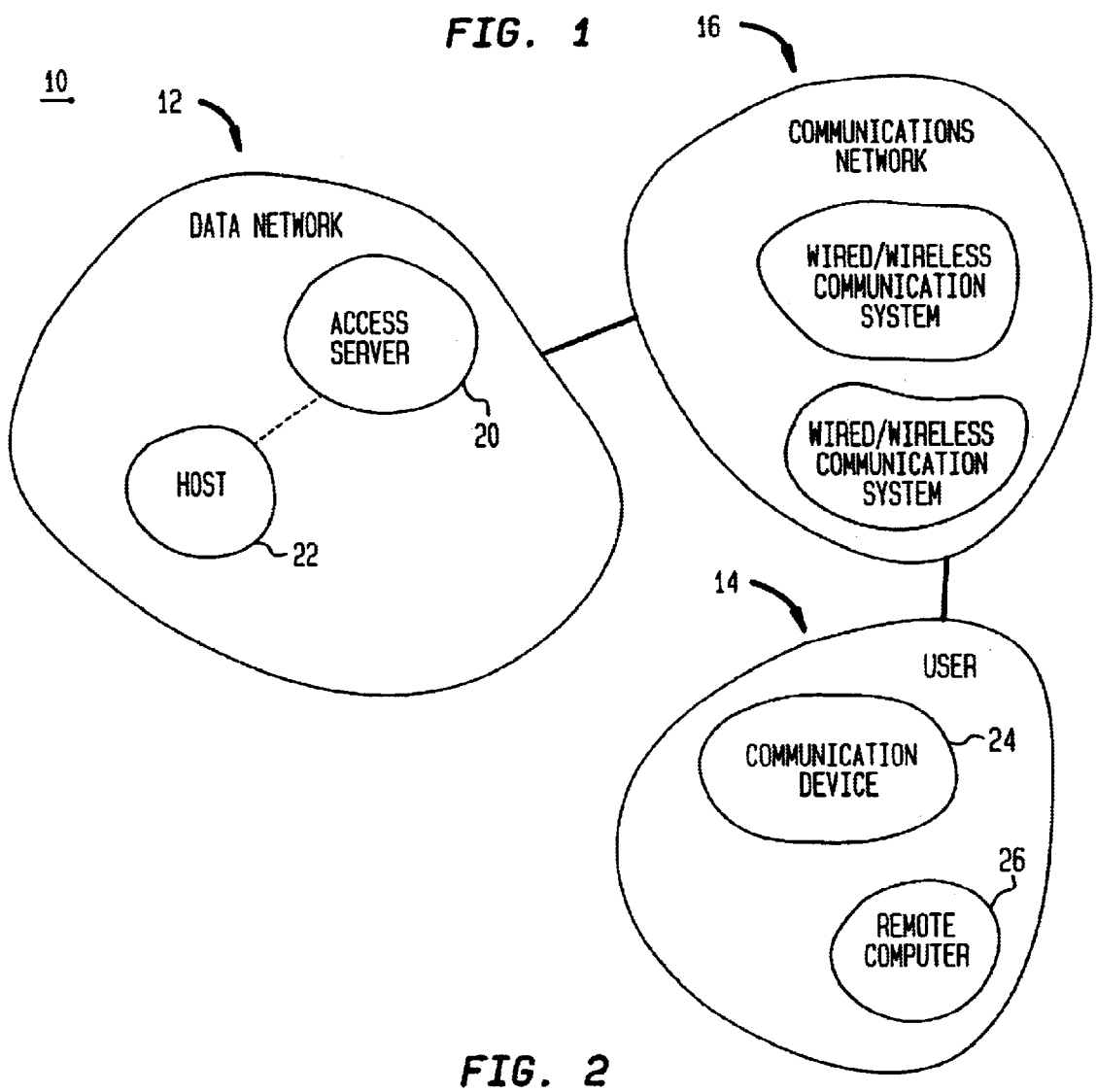
FIG. 1 depicts an architecture for a system for accessing a data network in accordance with the present invention.

FIG. 1 illustrates an architecture for a system 10 for accessing a data network in accordance with the present invention. The system 10 comprises a data network 12 (e.g., the Internet), a user 14, and a communications network 16. The communications network 16 comprises a plurality of wired and/or wireless communications systems for providing a wired and/or wireless connection between the data network 12 and the user 14. Wired communications systems include Public Switching Telephone Networks (PSTN), and networks based on Integrated Services Digital Network (ISDN), T1 lines and E1 lines. Wireless communications systems include those based on Frequency Division Multiple Access (FDMA), Time Division Multiple Access (TDMA) and Code Division Multiple Access (CDMA). The data network 12 comprises a plurality of interconnected computers including at least one access server 20 and at least one host 22. The access server 20 is a computer associated with a service provider to which the user 14 subscribes for accessing the data network 12. The host 22 is a computer having data sought by the user 14. The access server 20 and the host 22 may also be the same computer.

The user 14 comprises a communication device 24 (e.g., telephone, mobile-telephone and/or modem) for receiving and transmitting data from and to the access server 20 via the communications network 16, and a remote computer 26 having software for processing data for transmission to the access server 20 or for display on an output device associated with the remote computer 26, such as a video display, an audio display, a printer, memory, etc. The user 14 gains access to the data network 12 through the access server 20. Specifically, the user 14 dials a number associated with the access server 20. The communication network 16 connects the user 14 to the access server 20 using the dialed number. Upon connecting to the access server 20, the user 14 can retrieve data from the host 22.

In general, data (being retrieved by the user) may be in the form of a file or an output of a real time recording device, such as a video camera, microphone, scanner, fax, transducers or measuring devices. In all cases, the data will have associated information indicating a data type for the data. For purposes of discussion, the present invention will be described herein as retrieving data in the form of a file from the host 22. It should not be construed, however, to limit the present invention to retrieving data in the form of a file.

The data (or file) is retrieved via a bitstream from the host 22 to the access server 20 to the user 14. The bitstream includes the data and control information. The data has associated a filename with a file extension indicative of a data type (and/or sub-type). The control information includes a user indicator for identifying the user to whom the data is intended, error control information for correcting and/or concealing errors occurring during data transmission, and/or a data type indicator to identify the data type of the associated data. Data types include, but are not limited to, speech/voice, video/image and text. Each data type has one or more sub-types. Examples of speech/voice sub-types (and file extensions) include audio (.au), wave (.wav) and speech (.sp). Examples of video/image sub-types include tagged image format files (.tif), graphic image format files (.gif), Moving Picture Experts Group files (.mpg and .mp2). Examples of text sub-types include MS Word (.doc) and ASCII (.txt).

Adaptive Communications Formatting

Figure 2:
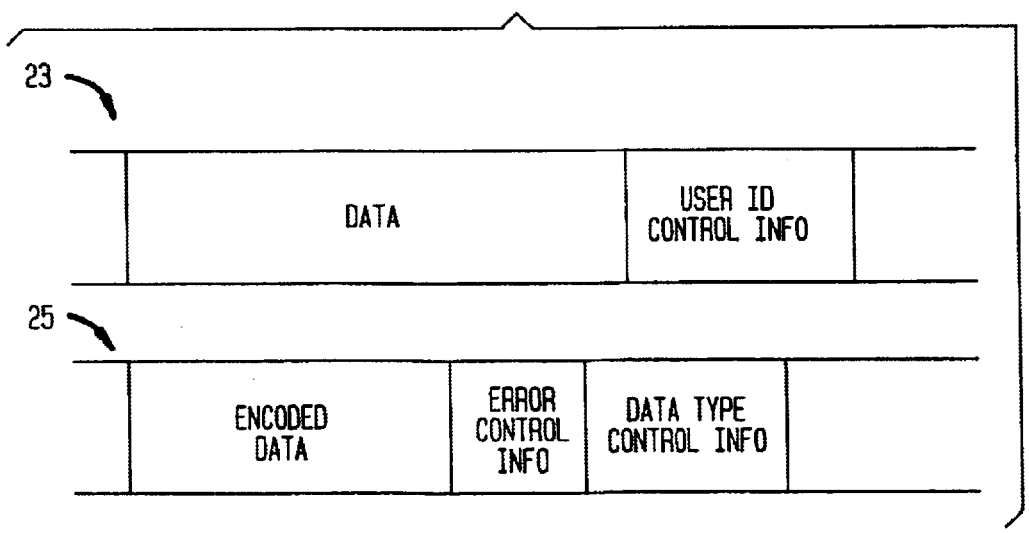
FIG. 2 depicts a bitstream entering and exiting the access server.

At the access server 20, the data is formatted using a mixture of transcoding techniques and error control schemes to facilitate data transmission within acceptable quality levels, as will be described herein. FIG. 2 illustrates a bitstream 23 entering and a bitstream 25 exiting the access server 20. When the bitstream 23 arrives at the access server, the bitstream 23 includes the data and user indicator-control information for identifying the user to whom the data is intended. The data is formatted by the access server 20 and transmitted to the user 14 via the bitstream 25, which includes encoded data, error control information for controlling and/or concealing errors resulting from data transmission, and data type indicator-control information for identifying the data type of the associated (encoded) data, as will be described herein.

Transcoding techniques include encoding algorithms for encoding (or compressing) the data. Encoding (or compressing) the data facilitates data transmission by reducing the amount of data to be transmitted which, in turn, decreases the time required to transmit the data (i.e., transmission time) from the access server to the user over a transmission channel of limited bandwidth (i.e., slower access speeds). Some encoding algorithms, however, have associated loss that may adversely affect data quality. Algebraic Code Excited Linear Prediction (ACELP), Vector Sum Excited Linear Prediction (VSELP), Enhanced Variable Rate Coder (EVRC), h.263 (which is a set of guidelines being considered by the International Telecommunications Union for implementation into standards), pkzip (by PKWare, Inc.), MPEG and MPEG2 (Moving Pictures Experts Group), and JPEG (Joint Pictures Experts Group) are some examples of encoding algorithms which are well-known in the art. Each of the aforementioned encoding algorithms have associated different levels or percentages of compression.

Error control schemes include techniques for correcting and/or concealing errors occurring during the transmission of data from the access server 20 to the user 14. Error control schemes provide means for assuring data integrity has not be compromised beyond acceptable levels. Some error control schemes, however, increase data transmission time by adding control information to the data and/or requiring retransmissions of the data when data error is detected. Forward Error Correction (FEC), Cyclical Redundancy Check (CRC), Automatic Retransmission Query (ARQ), hybrid ARQ (i.e., combination of ARQ and FEC) and error concealment (e.g., muting, extrapolation from previous good frames, and interpolation from previous and succeeding good frames) are some examples of error control schemes which are well-known in the art. Each of the aforementioned error control schemes have associated different levels of error correction and/or concealment.

The particular transcoding techniques and error control schemes used to format the data should be adaptive to factors such as the nature of the communications network 16 connecting the user 14 to the access server 20, the preferences of the user 14, and the data type of the data, as will be discuss herein. Note that the present invention should not be limited to being adaptive to only the aforementioned factors. Other factors, such as interactivity, bit rate and transmission delay, may also be applicable.

First Factor

The first factor involves the nature of the communications network 16 connecting the user 14 to the access server 20. The nature of communications systems, in general (regardless of whether the communication system is wired or wireless), varies from one to another. The nature of communications system depends on sub-factors such as whether the communications system is wired or wireless, whether the communications system is analog or digital, the available bandwidth, the bit rate, the signal-to-noise ratio, the bit error rate and the transmission delay, as will be described herein.

As mentioned earlier, the communications network 16 comprises a plurality of wired and/or wireless communication systems for providing the user 14 with either a wired or a wireless connection to the access server 20. For purposes of discussion, a wireless connection involves using at least one wireless communication system to connect the user 14 to the access server 20. By contrast, a wired connection involves using no wireless communication system to connect the user 14 to the access server 20. Wireless connections have several distinct disadvantages over wired connections. First, the transmission times for data over wireless connections are typically greater than the transmission times for the same data over wired connections. The reasons for this are because wireless connections generally have less available bandwidth, lower bit rates and longer transmission delays than wired connections. Therefore, it may be desirable to use a transcoding technique that will encode (or compress) the data as much as possible to reduce the transmission time over wireless connections (and perhaps some wired connections). The benefits realized in facilitating data transmission should, however, be balanced against losses associated with compression (or encoding).

Second, data transmitted over a wireless connection is more susceptible to data error than data transmitted over a wired connections. The reasons for this are because wireless connections generally have lower signal-to-noise ratios and higher bit error rates than wired connections. Therefore, it may be desirable to increase the amount of error control being applied to data transmissions over wireless connections. The benefits of increased error control (i.e., increased quality) should, however, be balanced against increased data transmission time.

Second Factor

The second factor involves the preferences of the user 14. The preferences of the user 14 should reflect the hardware and software capabilities of the user 14 and the access server 20, and a balancing between facilitating data transfer and acceptable data quality. The service provider and the subscribers should agree on the manner in which the data is to be formatted, i.e., agree on which transcoding techniques and error control schemes to use. Whatever manner is used by the access server 20 to format the data, the user 14 should be able to un-format the formatted data. In other words, the access server 20 should agree to use transcoding techniques and error control schemes compatible with transcoding techniques and error control schemes available at the user 14. Failure to use compatible transcoding techniques and error control schemes will result in the user 14 receiving a bitstream that it can not un-format. This agreement may be negotiated between the service provider and subscriber before or at the time the user connects to the access server 20. Preferences of the user 14 should also reflect a balancing by the user between facilitating data transfer and acceptable data quality. For example, if the user 14 requires high quality data, the user 14 might have to trade-off facilitating data transfer for increased data quality. Thus, the user 14 might select a transcoding technique with less compression and minimal loss (e.g., pkzip) and an error control scheme with greater error correction (e.g., ARQ) for formatting the data at the access server.

Third Factor

The third factor is the data type of the data. Certain transcoding techniques and error control schemes are more effective when used to format particular data types. Thus, the transcoding techniques and error control schemes selected to format the data should be adaptive to the data type, as will be described herein. Transcoding techniques include encoding algorithms for encoding or compressing particular data types: gzip and pkzip for text data; VCELP, ASELP and EVRC for speech/voice data; and h.263 for video/image data. Using a text transcoding technique (e.g., a transcoding technique with gzip) to compress speech/voice data may not be as effective as using a speech transcoding technique (e.g., a transcoding technique with VCELP) to compress the same data—that is, the amount of data compression may not be the same.

Error control schemes include techniques for different levels of error correction and/or concealment. The level or error correction and/or concealment applied to data should depend on the amount of error tolerable by the user which, in turn, depends on the data type. For example, errors in audio/speech and video/image data types may be tolerable to some extent. In such cases, errors in audio/speech data types may best be concealed by muting, and errors in video/image data types may best be concealed by interpolating from previous good frames. By contrast, errors in text data types may be intolerable. In this case, errors are corrected (not concealed) by requesting retransmissions of the data, i.e., ARQ.

Figure 3:
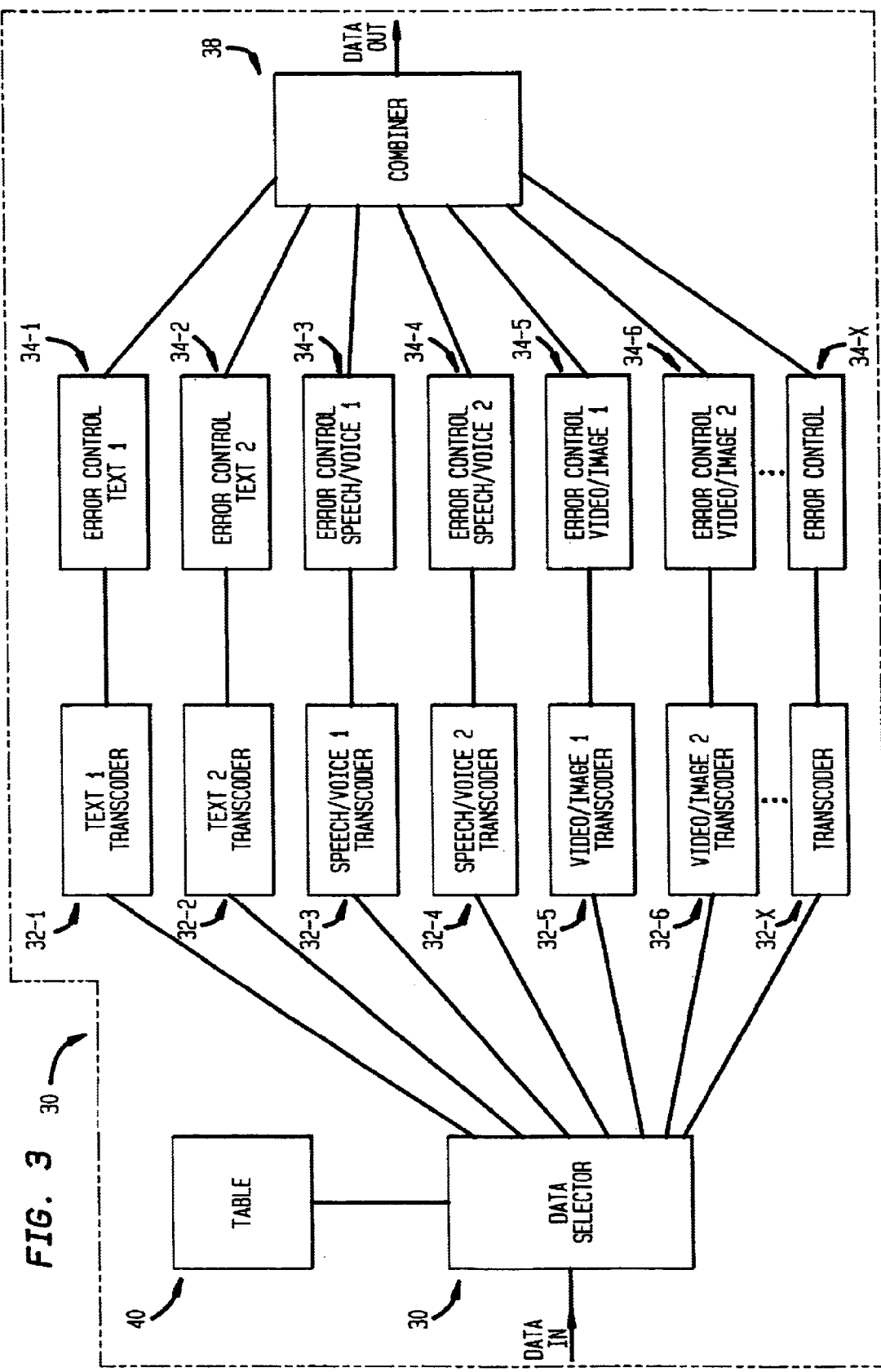
FIG. 3 depicts a functional block diagram of the access server in accordance with one embodiment of the present invention.

FIG. 3 is a functional block diagram of the access server 20 in accordance with one embodiment of the present invention. The access server 20 comprises a data selector 30, a plurality of text, speech/voice and video/image transcoding techniques 32-*n* (i.e., transcoding techniques for text, speech/voice and video/image data types), a plurality of text, speech/voice and video/image error control schemes 34-*n* (i.e., error control schemes for text, speech/voice and video/image data types) and a combiner 38 for multiplexing formatted data. The data selector 30 is a device, such as a microprocessor with software, for selecting a transcoding technique 32-*n* and an error control scheme 34-*n* for formatting the data. The transcoding technique 32-*n* and error control scheme 34-*n* is selected using the data type, the identity of the user, and/or a user table 40 specifying user preferences (i.e., transcoding techniques and error control schemes preferred by each user for each data type and/or sub-type). The data selector 30 can determine the data type using the file extension, other information contained within the bitstream, default data types and/or a combination of the aforementioned. For example, the data selector 30 may determine data with .wav file extensions are speech/voice data types. The data selector 30 can determine the identity of the user using the user indicator-control information (in the bitstream). Note that FIG. 3 shows an one-on-one correlation between the transcoding techniques and error control schemes. This should not, however, be construed to limit the present invention to embodiments with such a correlation. One-to-many correlation between transcoding techniques and error control schemes, or vice-versa, are also possible.

FIG. 4 illustrates an example of a user table 40. The transcoding techniques and error control schemes in the table 40 specified for each user and data type (and/or sub-type) should reflect the aforementioned factors, i.e., the nature of the communications network connecting the user to the access server, the equipment and software capabilities and/or preferences of the user and the access server, and the data type of the data. For example, suppose user number 000001 connects to the access server using a wireless connection. The table 40 specifies for user number 000001 a set of transcoding techniques and error control schemes for each data type (and/or sub-type) that are available to both user number 000001 and the access server and will facilitate data transmission within acceptable quality levels over a wireless connection. By contrast, user number 000222 is connected to the access server 20 via a wired connection. For users connected via a wired connection (e.g., user number 000222), the table 40 specifies no formatting (i.e., no transcoding techniques or error control schemes) because wired connections (with broader bandwidths) are less prone to error than narrower bandwidth wireless connections.

Note that the present invention should not be limited to using the table 40 depicted in FIG. 4. Other types of tables or collections of information, such as databases, may also be used to specify transcoding techniques and error control schemes for formatting data intended for particular users. Other information may also be stored in the table, such as an indication whether the user is connected via a wired or wireless connection, or separate sets of transcoding techniques and error control schemes for wired and wireless connections. Note that if the data selector needs to make a determination regarding the manner in which the user is connected to the access server, such a determination can be made using a flag indicative of the connection, a default, the telephone number dialed by the user to connect to the access server, etc.

The access server 20 may create or obtain the table 40 in a variety of manners. The subscriber may submit a competed form to the service provider indicating the transcoding techniques and error control schemes available to the user and the manner in which the user will connect to the access server. The service provider will use the information in the completed form to select transcoding techniques and error control schemes available to both the user and the access server, and optimal for the manner of connection. Such selections are then added to or used to build the table 40. Alternately, the user may provide such information electronically when accessing the access server 20 or the table may be constructed using default sets of transcoding techniques and error control schemes.

After the data selector 30 selects a transcoding technique and an error control scheme, the selected transcoding technique 32-*n* is used to encode (or compress) the data and the selected error control scheme 34-*n* is used to add error control information to the encoded data, as shown by the bitstream 25 in FIG. 2. Data type indicator-control information is then added to the formatted data (i.e., encoded data with associated error control information) when the formatted data is being multiplexed by the combiner 38. The multiplexed data is subsequently caused to be transmitted by the access server 20 to the user 14 over the communications network 16. At the user 14, the multiplexed data is de-multiplexed and un-formatted using the appropriate sets of transcoding techniques and error control schemes.

Specifically, the user 14 looks at the data type indicator-control information to select the appropriate transcoding techniques and error control schemes for un-formatting (or reciprocating the operations of the transcoding techniques and error control schemes at the access server) the formatted data. The un-formatted data is subsequently output to a video display, audio display, printer and/or computer memory associated with the remote computer 26.

FIG. 5 is a chart 50 illustrating examples transcoding techniques and error control schemes which might be used for transmission of particular data types over wireless connections. The chart 50 shows data sub-types and their associated bit rates, encoding algorithms and the bit rate of the data after encoding (or compression), and error control schemes. For example, data with an audio sub-type has a 256 Kbps bit rate. If a transcoding technique with a VCELP encoding algorithm is used to encode the audio data, the bit rate can be reduced to 8 Kbps. Subsequently, hybrid ARQ and muting (a form of error concealment) is applied to the encoded (or compressed) data in the error control scheme before being transmitted over a wireless connection.

Although the present invention has been described in considerable detail with reference to certain embodiments, other versions are possible. Therefore, the spirit and scope of the present invention should not be limited to the description of the embodiments contained herein.

We claim:

1. A method for transmitting data over a communications network, the method comprising the steps of:
   determining a data type for the data;
   selecting a transcoding technique and an error control scheme to format the data based on the data type;
   encoding the data using the selected transcoding technique; and
   applying the selected error control scheme to the encoded data, the selected error control scheme adding error control information to the encoded data.

2. The method of claim 1 comprising the additional step of:
   multiplexing the data for transmission over the communications network.

3. The method of claim 2, wherein the step of multiplexing includes adding a data type indicator to the data.

4. The method of claim 1, wherein the data type is determined using a file extension associated with the data.

5. The method of claim 1, wherein the data type is determined using a default data type.

6. The method of claim 1, wherein the transcoding technique and error control scheme are also selected based on nature of the communications network.

7. The method of claim 1, wherein the transcoding technique and error control scheme are also selected based on preferences of a user.

8. The method of claim 1, wherein the transcoding techniques and error control schemes are selected using information specifying a set of transcoding techniques and error control schemes for each data type.

9. The method of claim 1, wherein the transcoding techniques and error control schemes are selected using information specifying a set of transcoding techniques and error control schemes for each user.

10. The method of claim 1, wherein the transcoding techniques and error control schemes are selected using information specifying a set of transcoding techniques and error control schemes for a wireless connection between an access server and a user.

11. The method of claim 1, wherein the transcoding techniques and error control schemes are selected using default transcoding techniques and error control schemes.

12. The method of claim 1, wherein a transcoding technique using a pkzip encoding algorithm is selected for text data types.

13. The method of claim 1, wherein a transcoding technique using a ACELP encoding algorithm is selected for speech data types.

14. The method of claim 1, wherein a transcoding technique using a VSELP encoding algorithm is selected for speech data types.

15. The method of claim 1, wherein a transcoding technique using a EVRC encoding algorithm is selected for speech data types.

16. The method of claim 1, wherein an error control scheme using a hybrid ARQ error control scheme is selected for speech data types.

17. The method of claim 1, wherein an error control scheme using a hybrid ARQ error control scheme is selected for video data types.

18. The method of claim 1, wherein an error control scheme using an ARQ error control scheme is selected for speech data types.

19. The method of claim 1, wherein an error control scheme using an ARQ error control scheme is selected for video data types.

20. The method of claim 1, wherein an error control scheme using a muting technique is selected for speech data types.

21. The method of claim 1, wherein an error control scheme using interpolation techniques based on previous and succeeding good frames is selected for speech data types.

22. The method of claim 1, wherein an error control scheme using extrapolation techniques based on previous good frames is selected for speech data types.

23. The method of claim 1, wherein an error control scheme using interpolation techniques based on previous and succeeding good frames is selected for video data types.

24. The method of claim 1, wherein an error control scheme using extrapolation techniques based on previous good frames is selected for video data types.

25. The method of claim 1, wherein an error control scheme using an ARQ technique is selected for text data types.

26. A method for transmitting data over a communications network, the method comprising the steps of:
   determining a data type for the data;
   selecting a transcoding technique and an error control scheme to format the data based on the data type and whether the communications network includes a wireless communications system;
   encoding the data using the selected transcoding technique; and
   applying the selected error control scheme to the encoded data, the selected error control scheme adding error control information to the encoded data.

27. A method for transmitting data over a communications network, the method comprising the steps of:
   determining a data type for the data;
   selecting a transcoding technique and an error control scheme to format the data based on the data type and user preferences;
   encoding the data using the selected transcoding technique; and applying the selected error control scheme to the encoded data, the selected error control scheme adding error control information to the encoded data.

28. A method for transmitting data over a communication network, the method comprising the steps of:
   identifying a data type for the data using a file extension associated with the data;
   using the identified data type to select a transcoding technique and an error control scheme from a plurality of transcoding techniques and error control schemes;
   encoding the data using the selected transcoding technique; and
   applying the selected error control scheme to the encoded data.

29. A method as claimed in claim 28, including the step of multiplexing the data for transmission over the communications network.

30. A method as claimed in claim 29, wherein the step of multiplexing includes adding a data type indicator to the data.

31. A method as claimed in claim 28, wherein the selected error control scheme adds error control information to the data.

32. A method as claimed in claim 28, wherein the transcoding technique and error control scheme are also selected based on nature of the communications network.

33. A method as claimed in claim 28, wherein the transcoding technique and error control scheme are also selected based on preferences of a user.

34. A method as claimed in claim 28, wherein the transcoding technique and error control scheme are also selected using information specifying a set of transcoding techniques and error control schemes for each user.

35. A method as claimed in claim 28, wherein the transcoding technique and error control scheme are also selected using information specifying a set of transcoding techniques and error control schemes for a wireless connection between an access server and a user.

* * * * *